(12) United States Patent
Shade et al.

(10) Patent No.: US 12,544,592 B2
(45) Date of Patent: Feb. 10, 2026

(54) MACHINE-LEARNING-DRIVEN AUTO-PLANNING FOR RADIATION TREATMENT

(71) Applicant: Sun Nuclear Corp., Atlanta, GA (US)

(72) Inventors: Julie Shade, Baltimore, MD (US); Pranav Lakshminarayanan, Baltimore, MD (US); Peter Hoban, Crockernwell (GB); Praveen Sinha, Baltimore, MD (US)

(73) Assignee: Sun Nuclear Corp., Atlanta, GA (US)

( * ) Notice: Subject to any disclaimer, the term of this patent is extended or adjusted under 35 U.S.C. 154(b) by 242 days.

(21) Appl. No.: 18/041,586

(22) PCT Filed: Aug. 11, 2021

(86) PCT No.: PCT/US2021/045535
§ 371 (c)(1),
(2) Date: Feb. 14, 2023

(87) PCT Pub. No.: WO2022/051068
PCT Pub. Date: Mar. 10, 2022

(65) Prior Publication Data
US 2023/0293907 A1  Sep. 21, 2023

Related U.S. Application Data

(60) Provisional application No. 63/074,593, filed on Sep. 4, 2020.

(51) Int. Cl.
*A61N 5/00* (2006.01)
*A61N 5/10* (2006.01)

(52) U.S. Cl.
CPC .................. *A61N 5/1031* (2013.01)

(58) Field of Classification Search
CPC ......... A61B 6/03; A61N 5/103; A61N 5/1031
See application file for complete search history.

(56) References Cited

U.S. PATENT DOCUMENTS

| | | | |
|---|---|---|---|
| 2017/0083682 A1 | 3/2017 | Mcnutt et al. | |
| 2018/0043184 A1* | 2/2018 | Wu | A61N 5/1077 |
| 2018/0165423 A1 | 6/2018 | Kuusela et al. | |

FOREIGN PATENT DOCUMENTS

| | | |
|---|---|---|
| WO | 2015/083035 A1 | 6/2015 |
| WO | 2016/144915 A1 | 9/2016 |

OTHER PUBLICATIONS

International Search Report and Written Opinion for Application No. PCT/US2021/045535 dated Nov. 18, 2021 (8 pages).

(Continued)

*Primary Examiner* — Dani Fox
(74) *Attorney, Agent, or Firm* — Michael Best & Friedrich LLP

(57) ABSTRACT

Methods and systems for machine-learning-based prediction of a dose-volume histogram for radiotherapy treatment planning. The method includes receiving prescription information and a plan geometry. The plan geometry includes a planning target volume and an organ at risk. The method also includes extracting a plurality of input features using the plan geometry and a machine-learning model. The method further includes determining the dose-volume histogram by combining the plurality of input features using the machine-learning model.

20 Claims, 16 Drawing Sheets

(56) References Cited

OTHER PUBLICATIONS

Bai et al., "Approach and assessment of automated stereotactic radiotherapy planning for early stage non small cell lung cancer," BioMedical Engineering OnLine, 2019, 18: 101. Retrieved from the Internet <https://biomedical-engineering-online-biomedcentral.com/articles/10.1186/s12938-019-0721-7>.
Kazhdan et al., "A Shape Relationship Descriptor for Radiation Therapy Planning," Miccai, 2009, 12(Pt 2): 100-8.
Petit et al., "Increased organ sparing using shape-based treatment plan optimization for intensity modulated radiation therapy of pancreatic adenocarcinoma," Radiotherapy and Oncology, 2012, 102(1): 38-44.
Simari et al., "A statistical approach for achievable dose querying in IMRT planning," Med Image Comput Comput Assist Interv, 2010, 13(Pt 3): 521-528.
Wang et al., "A quality control model that uses PTV-rectal distances to predict the lowest achievable rectum dose, Improves IMRT planning for patients with prostate cancer," Radiotherapy and Oncology, 2013, 107(3): 352-357.
Wu et al., "Data-driven approach to generating achievable dose-volume histogram objectives in intensity-modulated radiotherapy planning," International Journal of Radiation Oncology Biology Physics, 2011, 79(4): 1241-1247.

* cited by examiner

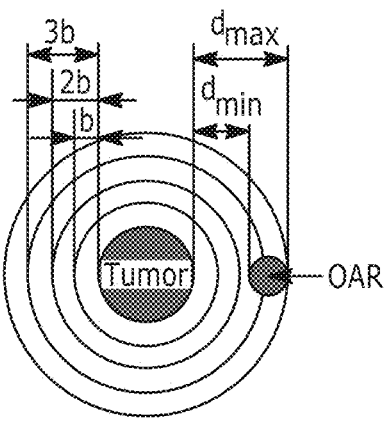 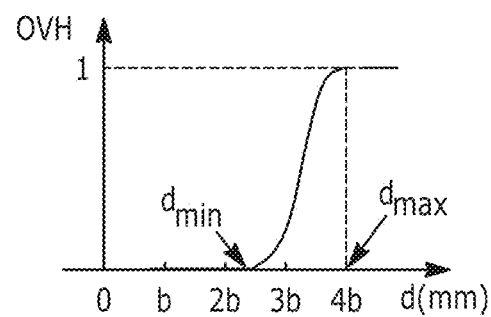
(a) Separated tumor And OAR  (b) OVH descriptor corresponding to (a)
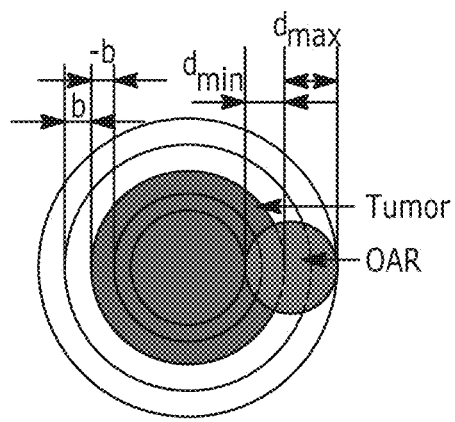 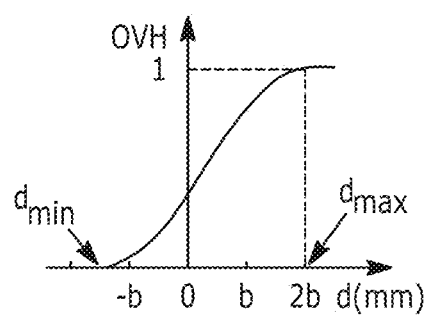
(c) Overlapped tumor And OAR  (d) OVH descriptor corresponding To (c)
FIG. 2

| Test | Clinical Acceptability of Plan | | | | | | Preferable Plan | | | |
|---|---|---|---|---|---|---|---|---|---|---|
| | RadOnc A | | RadOnc B | | RadOnc C | | RadOnc A | RadOnc B | RadOnc C | Overall |
| | Auto | Clin | Auto | Clin | Auto | Clin | | | | |
| P2 Low | Yes | Marginal | Yes | Yes | Yes | Yes | Auto 12-0 | Auto 10-2 | Auto 9-3 | Auto 12-0 |
| P3 Low | Yes | Yes | Yes | Yes | Yes | Yes | Auto | Auto | Auto | Auto |
| P4 Low | Yes | No | Yes | No | Yes | No | Auto | Auto | Clin | Auto |
| P3 Int | Yes | Yes | Yes | Yes | Yes | Yes | Auto | Auto | Auto | Auto |
| P4 Int | Yes | Yes | Yes | Yes | Yes | Marginal | Auto | Auto | Clin | Auto |
| P5 Int | Yes | Yes | Yes | Yes | Yes | Yes | Auto | Auto | Auto | Auto |
| P1 High | Yes | Marginal | Yes | No | Marginal | Marginal | Auto | Auto | Clin | Auto |
| P2 High | Yes | Yes | Yes | Yes | Yes | Yes | Auto | Clin | Auto | Auto |
| P3 High | Yes | Yes | Yes | Yes | Yes | Yes | Auto | Clin | Auto | Auto |
| P4 High | No | No | No | No | Marginal | No | Auto | Auto | Auto | Auto |
| P5 High | Yes | Marginal | Yes | Yes | Yes | Yes | Auto | Auto | Auto | Auto |
| P6 High | Yes | Marginal | Yes | Yes | Yes | Yes | Auto | Auto | Auto | Auto |

FIG. 13

MACHINE-LEARNING-DRIVEN AUTO-PLANNING FOR RADIATION TREATMENT

CROSS-REFERENCE TO RELATED APPLICATIONS

The present application is related to and claims benefit under 35 U.S.C. § 119(e) from U.S. Provisional Patent Application Ser. No. 63/074,593, filed Sep. 4, 2020, entitled "MACHINE-LEARNING-DRIVEN AUTO-PLANNING FOR RADIATION TREATMENT," the entire contents of which being incorporated herein by reference.

BACKGROUND

Modern radiotherapy (RT) treatment is highly computerized, both in controlling the machine that delivers radiation to the patient, and in creating the treatment plan where radiation oncologists and medical dosimetrists design and visualize the distribution of radiation dose to be absorbed by the patient. Achieving the ideal dose distribution inevitably includes tradeoffs, due to the competing needs of fully covering the tumor with a high enough dose (the prescription) to eradicate all cancer cells, and minimizing the degree to which harmful dose levels encroach on nearby organs at risk (OARs). There are further tradeoffs between organs, because although excess dose deposited by beams entering and exiting the body can be directed to different regions, it cannot be eliminated or significantly reduced overall for a given treatment modality. This means that preferentially sparing one organ increases dose elsewhere.

SUMMARY

During the treatment planning process, a user of a treatment planning system (TPS) attempts to adjust radiation beam properties so that dose is apportioned in a manner that satisfies the prescription and adheres to dose sparing criteria for each OAR. Adjustment of radiation beam properties can by automated via an inverse planning process whereby one or more electrical processors iteratively adjust beam properties until certain dosimetric constraints and goals are met most closely. Tradeoffs between target coverage and OAR sparing, and between sparing of different OARs are factored into this process. A more favorable overall plan can generally be achieved, and arrived at more quickly, if achievable dose sparing goals are set for each OAR, thus maintaining a suitable balance between the forces applied to reduce dose to each OAR during inverse planning. Disclosed herein is a system and method for automated treatment planning that uses machine learning (ML) models to predict achievable radiation doses to each OAR.

The present disclosure provides a method for machine-learning-based prediction of a dose-volume histogram for radiotherapy treatment planning. In one implementation, the method includes receiving prescription information and a plan geometry. The plan geometry includes a planning target volume and an organ at risk. The method also includes extracting a plurality of input features using the plan geometry and a machine-learning model. The method further includes determining the dose-volume histogram by combining the plurality of input features using the machine-learning model.

The present disclosure also provides a system for machine-learning-based prediction of a dose-volume histogram for radiotherapy treatment planning. In one implementation, the system includes an electronic processor and memory. The memory stores instructions that, when executed by the electronic processor, cause the electronic processor to receive prescription information and a plan geometry. The plan geometry includes a planning target volume and an organ at risk. The instructions also cause the electronic processor to extract a plurality of input features using the plan geometry and a machine-learning model. The instructions further cause the electronic processor to determine the dose-volume histogram by combining the plurality of input features using the machine-learning model.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

FIG. 2 includes schematics of examples of overlap-volume histograms calculations for overlapping and non-overlapping OAR/PTV geometries.

FIG. 13 is a table of example test case results.

Figure 1:
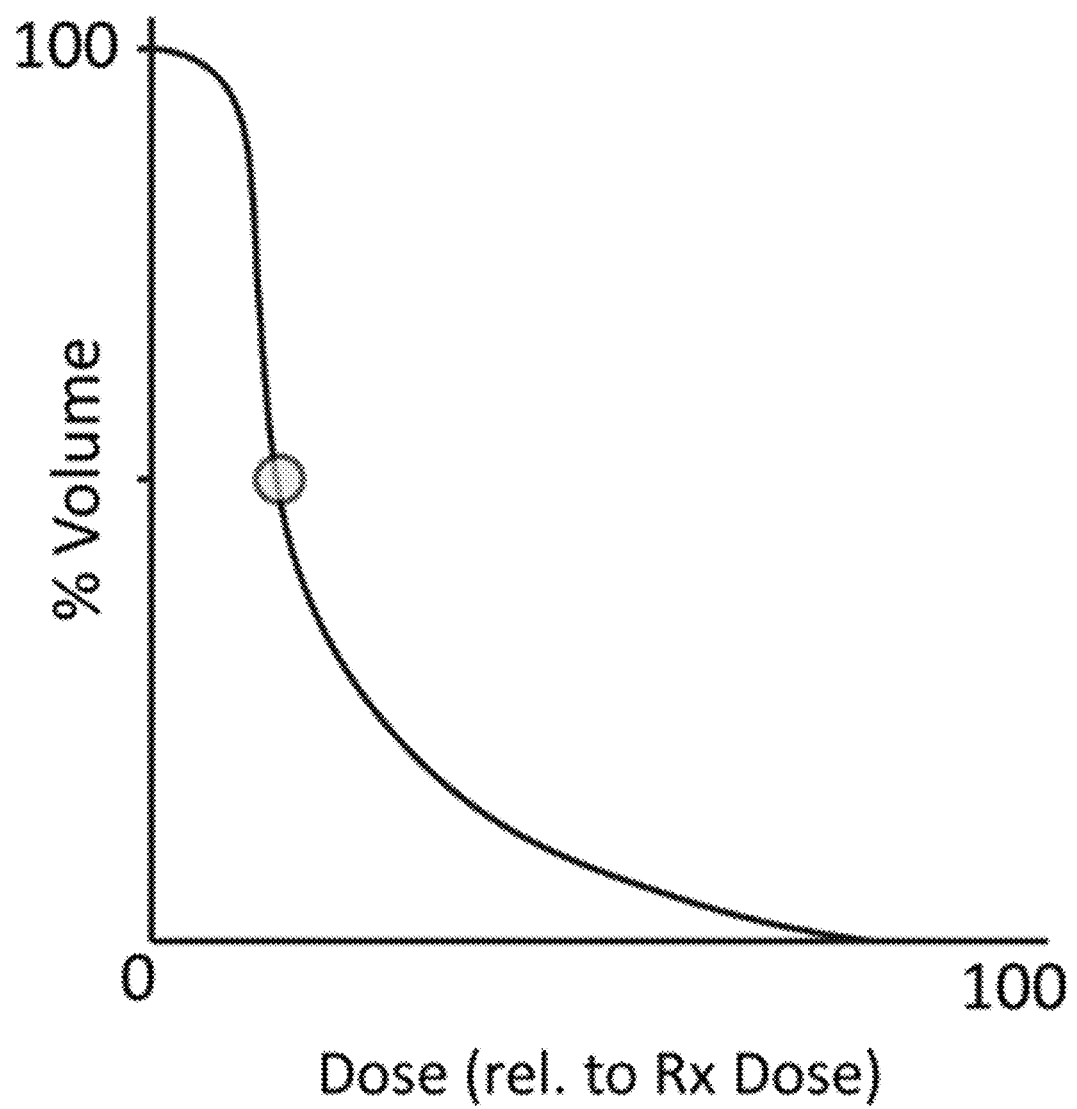
FIG. 1 is a graph of one example of a cumulative normalized dose volume histogram (DVH).

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

Use of Dose Volume Histograms in Radiotherapy Treatment Planning.

The goal of RT treatment planning is to provide a uniform high dose of radiation to a tumor while minimizing radiation dose to nearby organs at risk (OARs). The three-dimensional radiation dose to each structure can be summarized by a cumulative dose volume histogram (DVH). Each coordinate in the DVH represents the relative percent volume of a region of interest (ROI) that receives a radiation dose greater than or equal to the dose value. Dose values may be either absolute, in units of Gy or cGy, or relative, in units representing a percentage or proportion of a dose such as the prescription dose. FIG. 1 shows one example of a cumulative DVH with dose in percentage units. The circled point can be read as "50% of the volume of the organ at risk receives a radiation dose greater than or equal to 20% of the prescribed dose to the tumor." Each OAR is associated with one or more DVHs, whereby a DVH corresponds to each treatment plan. There may be one or more treatment plans comprising a course of treatment for a patient. Further, each treatment plan may include one or more target volumes to be covered with a prescribed dose.

RT treatment planning systems use a series of dose goals as input, for example, "no more than 50% of the rectum receives a dose of greater than 30 Gy" or "a dose of 80 Gy is provided to at least 95% of the tumor." The treatment planning system solves a non-convex optimization problem that considers the patient's anatomy and dose goals to determine the optimal radiation beam orientations, beam intensities, and collimator settings necessary to reach these dose goals. This is typically a labor-intensive, manual process in which a dosimetrist repeatedly adjusts the dose goals and re-optimizes the plan until it is satisfactory.

The goal of the systems and methods described herein is to predict, prior to optimization, the DVHs for the best possible treatment plan for a given patient. The dose goals can then be read directly from the predicted DVHs and input to the treatment planning system for its optimization problem, eliminating the need for manual goal-setting and adjustment by a dosimetrist and often both improving the quality of the resulting plan and the speed at which it can be arrived at. The systems and methods described herein use machine learning with domain-specific inputs that describe the geometrical relationships between target volumes and organs at risk to predict the expected and best-achievable DVHs based on previous treatment plans for patients with similar anatomy and disease classification.

Sources of Input Features for a Machine Learning Model for Dose Volume Histogram Prediction.

Overlap-volume histograms (OVHs) are one example source of input features for a machine leaning model for dose volume histogram prediction. OVHs characterize the spatial relationship between two shapes, usually a planning target volume (PTV) and an organ at risk (OAR). FIG. 2 illustrates the OVH concept. An OVH is a series of two-dimensional points (R, V) that represent a dimensionality reduction of the geometrical relationship between two objects in three-dimensional space. These points describe how much of an object's fractional volume (v) is within a given distance (r) from the other. For example, an OVH point (3, 0.7) can be read as "70% of the OAR is within 3 cm of the PTV." OVH's are monotonically increasing functions, with values ranging from 0 to 1 (representing fractional volume). OVH curves further to the left on the distance axis indicate that the two shapes are closer to one other, whereas curves further right indicate that the shapes are farther apart. Note the similarity between an OVH and a DVH: whereas an OVH expresses OAR volume within a given distance from a PTV, a DVH curve expresses OAR volume covered by a given dose. Furthermore, for a given OAR and a given volume coordinate on a OVH, there is a correlation between the distance coordinate on the OVH and the dose coordinate on the DVH, whereby a larger distance value typically corresponds to a smaller dose value because of the general reduction in dose as a function of distance from a PTV. This relationship between distance on an OVH and dose on a DVH is the basis of the choice of OVH plots as an input to a DVH prediction model.

An OVH for a tumor T and organ O can be defined as the volume (v) of the organ at a distance of r or less from the tumor.

$$OVH_{O,T}(r) = \frac{\|p \in O \mid d(p, T) \leq r\|}{\|O\|}$$

where d(r, T) is the signed distance of r from the tumor's boundary and $\|O\|$ is the volume of the OAR.

The tumor (T) and OAR (O) are contoured in the same coordinate system. T and O are typically contoured from the same series of computed tomography (CT) images. If T and O are not contoured in the same coordinate system, one structure must be transformed and resampled to the other's coordinate system. Both structures are represented as binary image data, where each point has a value of '1' if it is a part of the ROI, and '0' if not.

One example of a method for determining an overlap-volume histograms includes getting the sign of all points in O. Points inside O and inside T are −1 and points outside T are +1. To get the signal, a mask of points inside the tumor is created (T∩O), and the interior mask is subtracted from the original T for the sign mask S=T−2(T∩0). The method also includes computing the distance from each point in O to the surface of T. Computing the distance includes: (a) computing the edge mask E from the tumor T; (b) converting all points in E and O to physical coordinates based on image resolution; (c) indexing all points in E in a k-d tree data structure; (d) querying all points in O to find the closest point in E and the distance to that point; and (e) multiplying each point's distance by its sign in S. The method also includes creating a histogram of the distance data computed in the previous steps.

Standard OVHs provide a shape descriptor of two structures in three-dimensional space, whereby the OVH distance coordinate pertains to the closest distance to the corresponding PTV in any direction in three-dimensional space. A standard OVH is therefore referred to here as a xyzOVH. The implicit assumption in correlating OVH distance to DVH dose is thus that dose falls off from the PTV in an isotropic manner. However, this may not be the case, especially when the axes of the radiation beams are directed at the PTV within a single two-dimensional plane. It is thus possible to apply domain knowledge of typical beam geometry to extract features that further encode aspects of the spatial relationship that may be important in treatment planning.

Projection-masked OVHs (pOVH) are another example source of input features for a machine leaning model for dose volume histogram prediction. Projection-masked OVHs are a shape relationship descriptor that utilizes nearest distance from a point within an OAR to the PTV within only a given plane, or along a given axis. Projection-masked OVHs consider only the points in an OAR (O) that fall inside of a projection of the tumor (T) about or along a given axis. By constructing OVHs that only consider points in certain directions, it is possible to discern the different rates of dose falloff from the target volume resulting from the specific treatment technique.

Figure 3:
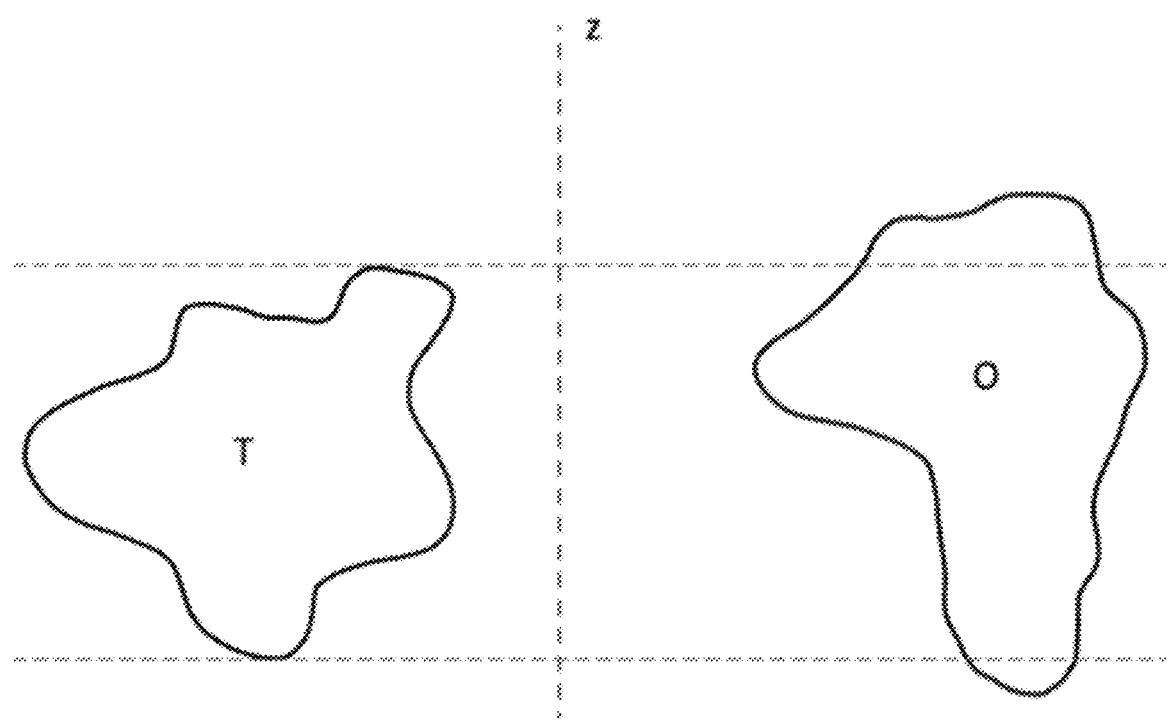
FIG. 3 is a schematic of one example of an about-Z-axis pOVH masking for a representative tumor (T) and organ at risk (O) geometry.
Figure 4:
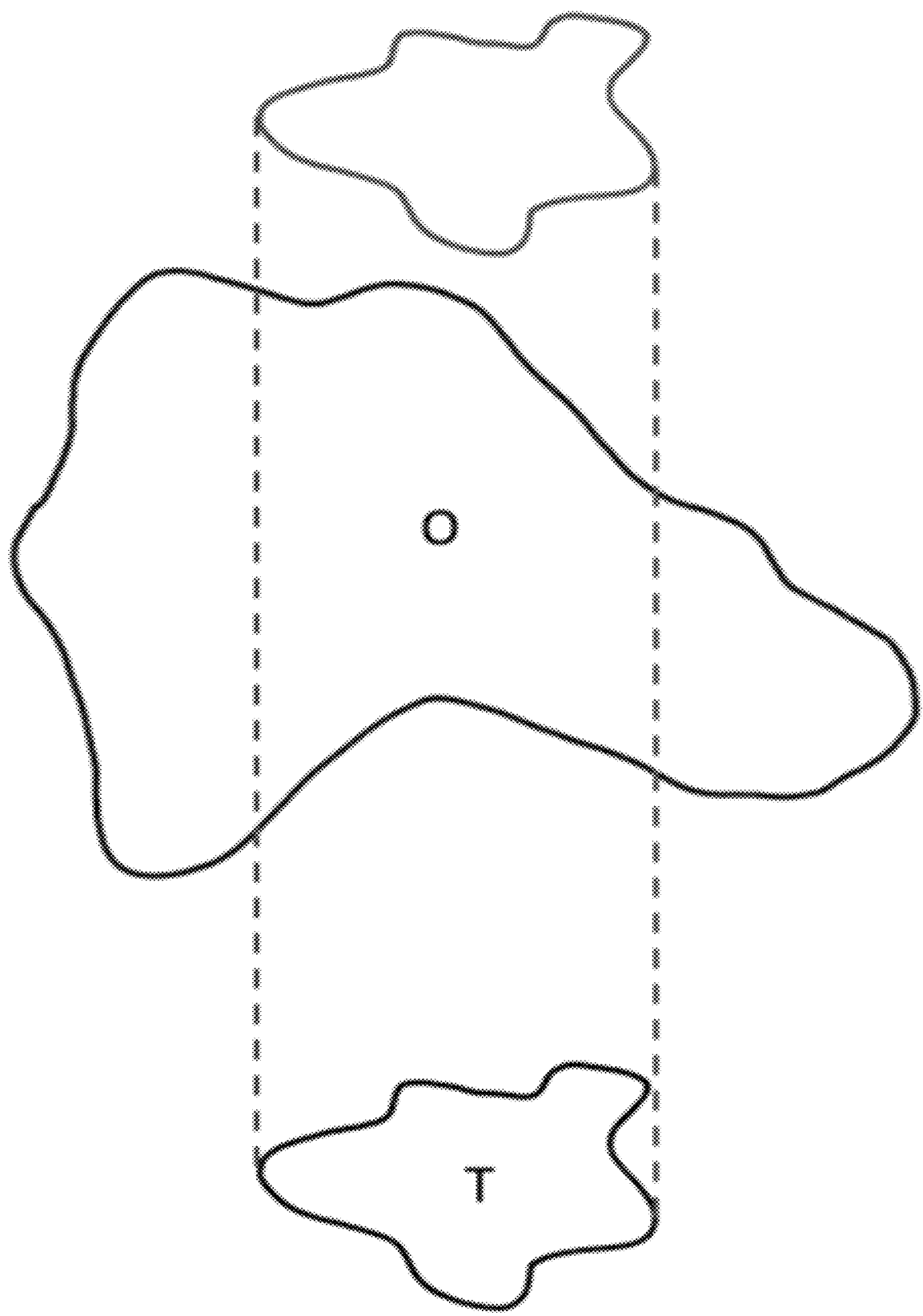
FIG. 4 is a schematic of one example of an along-Z-axis pOVH masking for a representative tumor (T) and organ at risk (O) geometry.

About-axis pOVHs project a volume T in all directions across a plane perpendicular to an axis. This OVH is denoted by the two directions defining the plane. For example, an xyOVH projects the tumor T about the z-axis, and only points in O that share a z-value with a point in T are considered. In radiotherapy, this type of shape descriptor is useful to isolate the part of the OAR that is coplanar with the tumor volume and is thus more likely to be impacted by radiation dose. FIG. 3 illustrates the marking procedures for an about Z-axis pOVH (xyOVH). The pOVH masking is shown in FIG. 3 as horizontal dashed lines. Along-axis pOVHs project a volume T along an axis. This OVH is denoted by the axis that the tumor is projected along. For example, a zOVH projects the tumor T along the z-axis and only points in that intersection are considered. FIG. 4 illustrates the masking procedure for an along-Z-axis pOVH (zOVH). The pOVH masking is shown in FIG. 4 as vertical dashed lines.

Dose-Volume Histograms (DVHs) are another example source of input features for a machine leaning model for dose volume histogram prediction. DVHs are a source of input features as described below, whereby dose values are obtained using DVH curves identified via OVH information. Other example sources of input features for a machine leaning model for dose volume histogram prediction include PTV geometry, OAR geometry, and the RT prescription.

Extraction of Input Features for the Machine Learning-Based DVH Prediction Process After querying the training data and calculating OVHs and DVHs for each plan, features are extracted from the standard OVH (xyzOVH), and projection masked OVHs (xyOVH, and zOVH), as well from OVH-DVH relationships, additional geometric descriptors, and from the RT prescription. The dose to each relative % volume for each OAR is predicted independently, thus, features are extracted for each % volume separately, and the predicted DVH curve is constructed and post-processed following all predictions.

Figure 5A:
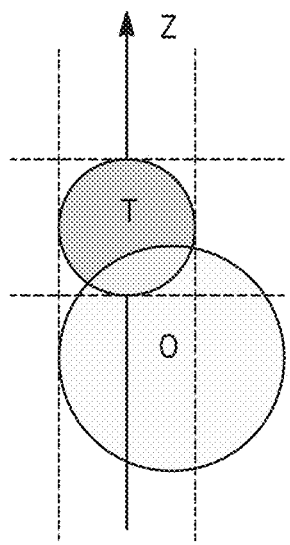
FIG. 5A is diagram of one example of a two-dimensional representation of a three-dimensional tumor (T) and organ at risk (O).
Figure 5B:
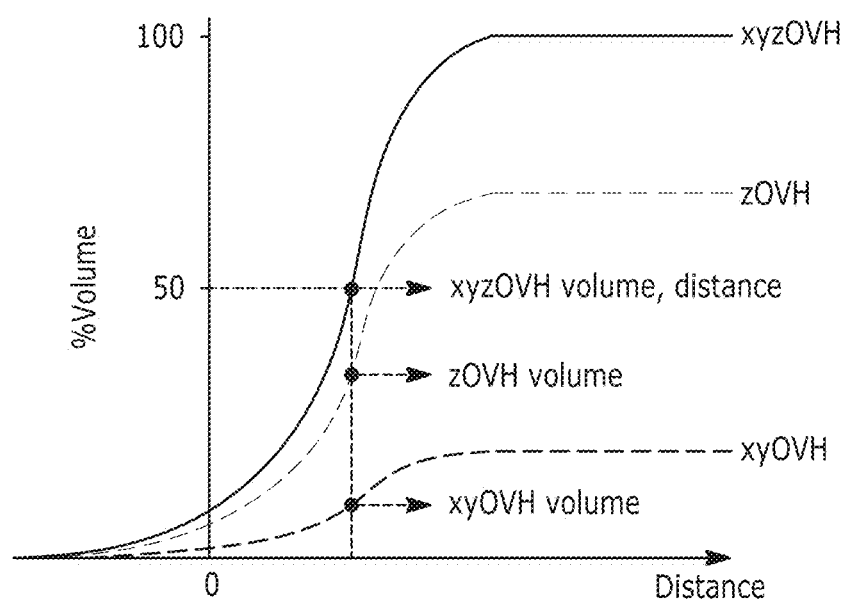
FIG. 5B is a graph of one example of OVHs and extracted distance, volume features at 50% volume for the PTV-OAR geometry illustrated in FIG. 5A.

Distance and volume points are examples of features that are extractable from OVHs. At each relative % volume, distance and volume features are extracted: xyzOVH volume, distance, zOVH volume, and xyOVH volume. zOVH and xyOVH volumes are taken at the distance point corresponding to the xyzOVH volume because the zOVH and xyOVH do not describe the entire OAR volume and typically have a lower maximum than that of the xyzOVH. Thus, distance information is not available for volumes above the maximum volume. FIG. 5 illustrates extraction of distance and volume features at 50% volume for a representative PTV-OAR geometry. The dashed lines in FIG. 5 indicate about-axis and along-axis projections.

OVH shape features are another examples of features that are extractable from OVHs. An additional set of features were developed to quantify the shape of each OVH (xyzOVH, zOVH, and xyOVH) at and near each % volume ($v_{xyz}$). For each % volume OVH point (dist, $v_{xyz}$), the 1st and 2nd derivative of each OVH at the corresponding distance (dist) are calculated and included as inputs to the feature selection step of the machine-learning process.

Figure 6:
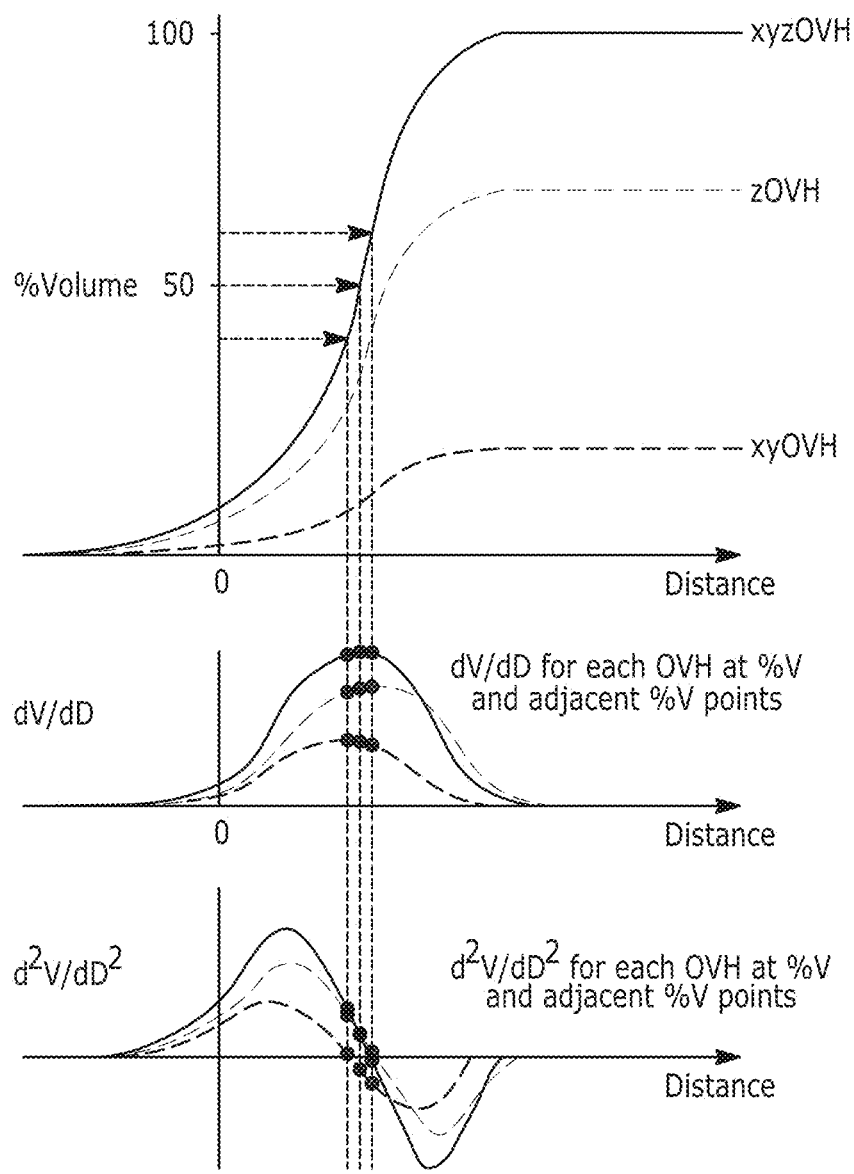
FIG. 6 are graphs of example extractions of OVH shape features.

The $1^{st}$ and $2^{nd}$ derivative of the adjacent points (dist+2 mm, $v_{xyz}+\Delta v_{xyz,+}$) and (dist-2 mm, $v_{xyz}-\Delta v_{xyz,-}$) are also included as features for ($v_{xyz}$), as well as the moving average of the $1^{st}$ and $2^{nd}$ derivative of each OVH at each point: (dist, $v_{xyz}$), (dist+2 mm, $v_{xyz}+\Delta v_{xyz,+}$), (dist-2 mm, $v_{xyz}-\Delta v_{xyz,-}$). These features may provide additional information about the spatial relationship to the machine-learning process. An example of a method for extraction of these features is illustrated in FIG. 6.

Additional features can be extracted to quantify the relationships between the about-axis (xyzOVH), along-axis OVH (zOVH), and standard OVH (xyOVH). These include, for example, the differences between each OVH volume point at the same distance (dist):

$v_{xyz}-v_{xy}$, $v_{xyz}-v_z$, $v_{xy}-v_z$

These also include the ratios of the different OVH volumes at the same distance (dist):

$v_{xyz}/v_{xy}$, $v_{xyz}/v_z$, $v_{xy}/v_z$

Features Extracted from Dose-Volume Relationships

Figure 7:
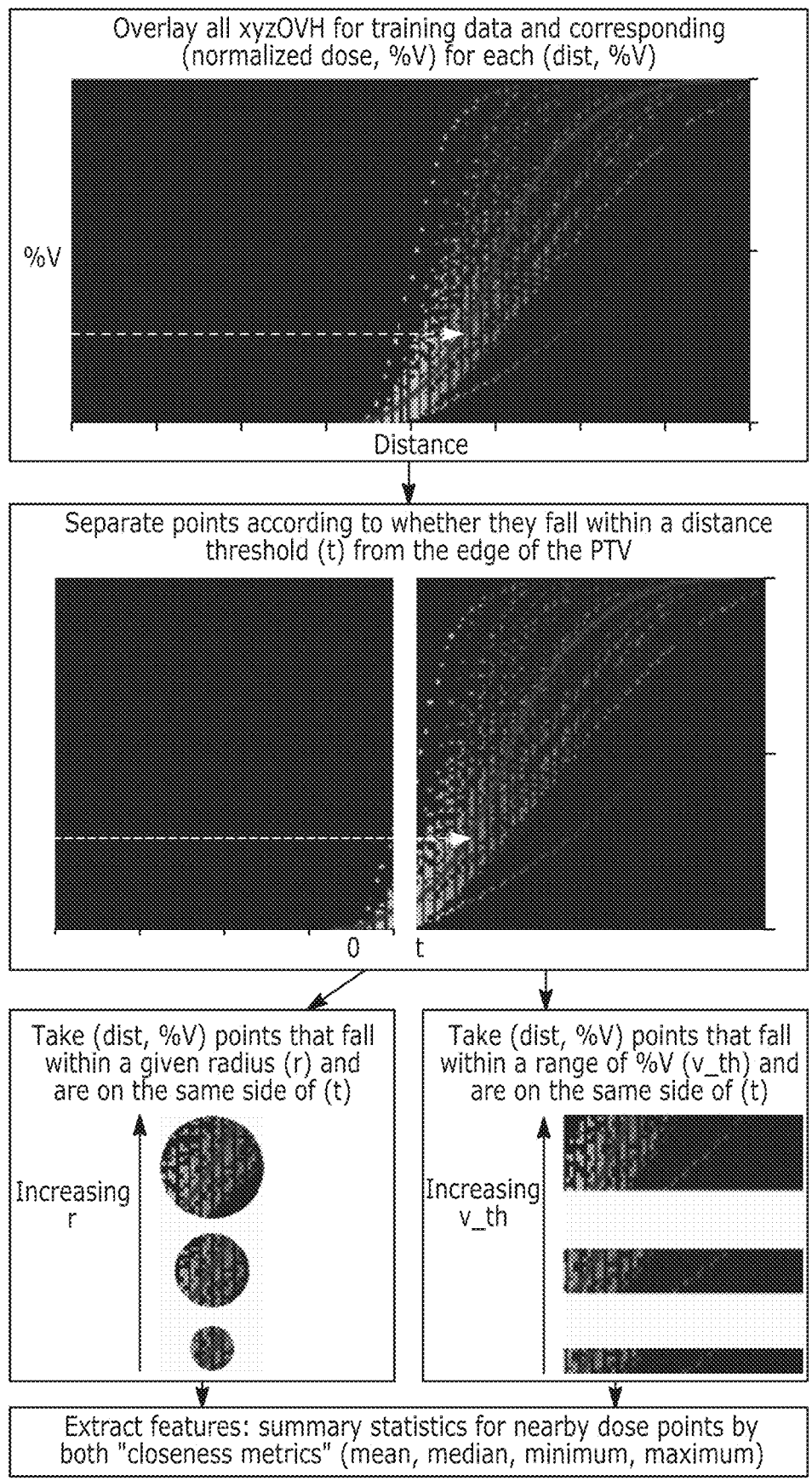
FIG. 7 is flow diagram of one example of a process for extraction of OVH-DVH features.

The next set of features are extracted by relating distance-volume relationships to dose-volume relationships, as in the previously developed statistical dose prediction method. FIG. 7 illustrates an example of a procedure for extracting these features. In a first step, all OVH points for all plans in the training data set are overlaid onto the same (dist, $v_{xyz}$) axes. In a second step, normalized dose values (normalized dose, $v_{xyz}$) are assigned to each (dist, $v_{xyz}$) point in the set. In a third step, training points are split according to whether they fall within a "within PTV" distance threshold (t) from the edge of the PTV. t may be greater than zero to account for treatment techniques in which high dose is given to a small additional margin outside the PTV in addition to the contoured PTV region. In a fourth step, for the current $v_{xyz}$ in question, for the dist value for a given OVH in the training set, sets of corresponding (dist, $v_{xyz}$) points on the training data plot are found according to closeness metrics relative to the given (dist, $v_{xyz}$) point. First, the set of all (dist, $v_{xyz}$) that fall within a given radius (r) of the given (dist, $v_{xyz}$) coordinate are found, where r is the magnitude of a vector with components dist and $v_{xyz}$, and that are on the same side of the "within PTV" threshold (t). Second, the set of all (dist, $v_{xyz}$) that fall within a given range of the current $v_{xyz}$, ($v_{xy}\pm v_{th}$) are found, and that are on the same side of the "within PTV" threshold (t). In a fifth step, features for nearby points are extracted by both "closeness metrics", radius and volume threshold: mean normalized dose, median normalized dose, minimum normalized dose, and maximum normalized dose.

Of note, $v_{th}$, r, and t are treated as hyperparameters and are optimized along with other hyperparameters of each machine-learning model as explained in the following section. This aspect of our ML approach "designs" optimal features for each PTV-OAR combination, rather than make a priori assumptions about how to best quantify the distance-dose-volume relationship and about the contents of the training data set. For example, a larger threshold t may be optimal for some PTVs or disease risk categories depending on treatment technique, or a larger radius for calculation of dose summary statistics may be necessary when there is higher variability in the distance-dose-volume relationships in the training set.

Additional features are extractable from the PTV geometry, OAR geometry, and the RT prescription. Unlike the features described above, these features are the same for every % volume for a given PTV-OAR combination and treatment plan. These features include, for example, the PTV volume, OAR volume, surface area of the projection of the PTV into the xz and yz planes to account for the typical beam placement with direction perpendicular to the z-axis, and the prescribed dose to the PTV.

Dose-Volume Histogram Prediction with Inputs and Machine-Learning

Training Data Preparation

Prior to feature extraction, all plans in the training data set are stratified according to disease risk (low/intermediate, and high) and PTV size (small, S, and large, L) to ensure similar plans were used to train each model. Large PTVs included the pelvic lymph nodes and were typically part of multi-phase treatment plans for high-risk patients. For high-risk plans with multiple targets, predictions can be made separately for each phase if the treatment is delivered sequentially, or for a single phase with multiple PTVs if the treatment is delivered simultaneously.

This approach uses clinical knowledge to maximize the amount of training data for each model while ensuring that all plans used to train each model were similar, and that each model was trained with clinical data representative of the variations in RT prescription, protocol, and patient anatomy that may be seen in practice. Plans used for training are also selected according to target coverage (the proportion of the target that received at least the prescribed radiation dose) so that the resulting models described different levels of "strictness" in adhering to coverage of the target with the prescription dose. Plans with lower target coverage in the training data correspond to those where OAR dose is lower than would have been possible while maintaining a higher target coverage. Thus, inclusion of these plans leads to predicted OAR doses that are lower than what is achievable for clinical plans where a higher level of target coverage is maintained. Coverage criteria for plan sorting criteria are designed to be adjustable to account for a wide range of coverage requirements in different protocols.

Machine-learning models are trained to predict the relative dose (normalized to the prescription dose to the PTV) to each relative percent volume of each OAR. A separate machine-learning model is developed for each combination of OAR and PTV type (low/intermediate risk with small PTV, high risk with small PTV, and high risk with large PTV) to make predictions for the individual phases of each course. Prediction of the normalized dose is done to increase the generalizability, so that the models are applicable to previously unseen prescriptions, and so the model learns the relationship between the geometrical relationships and other inputs and the shape of the resulting DVH for each OAR, rather than trying to infer the prescribed dose. The prescribed dose is included as an input to the model in case it has any influence on the shape of the resulting DVH. After predictions of normalized dose values are made, these are translated to absolute doses using the prescription.

Figure 8:
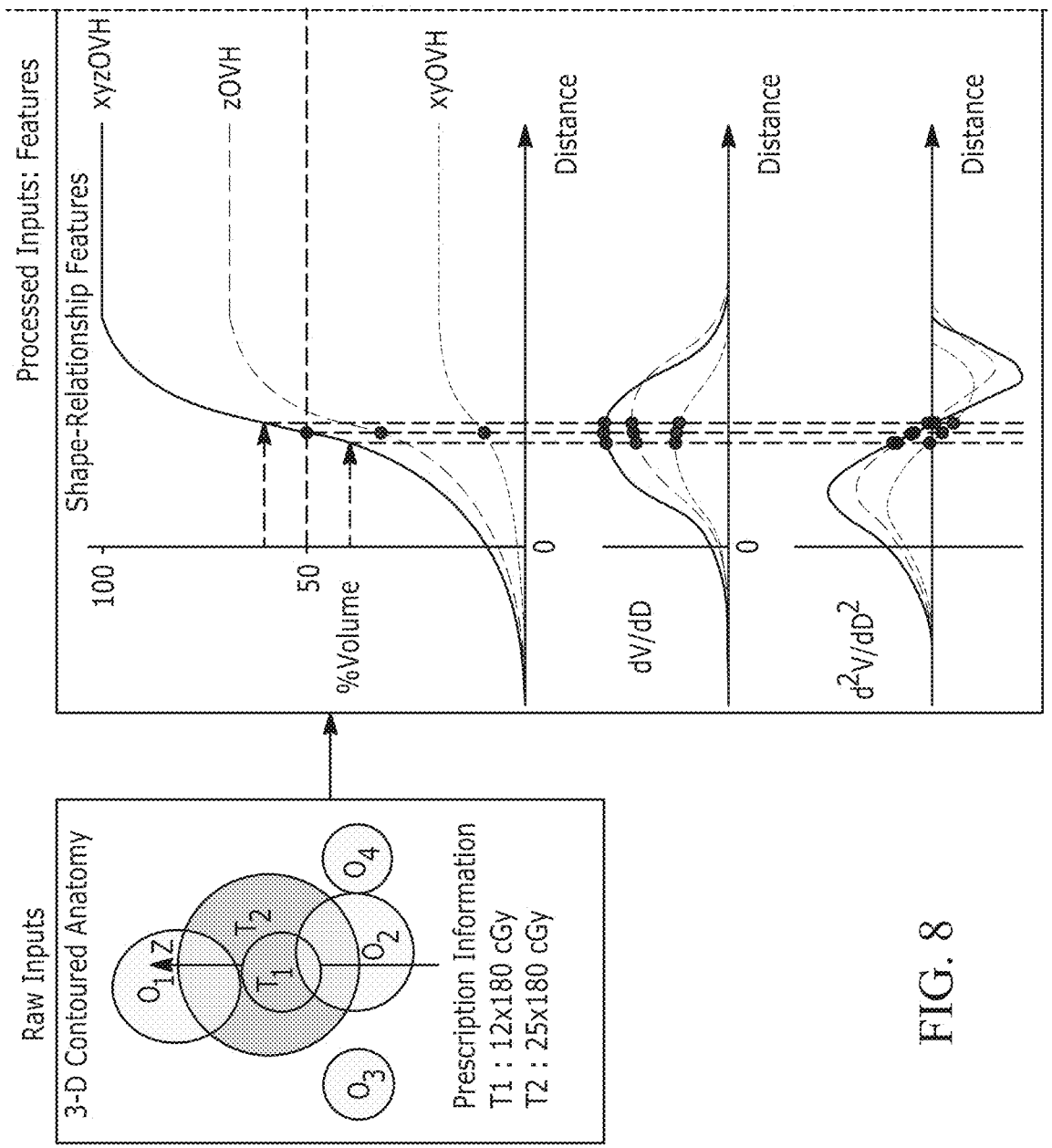
FIG. 8 is diagram of one example of an extraction of processed input features and outputs for each plan in a training data set prior to machine-learning model training.
Figure 8:
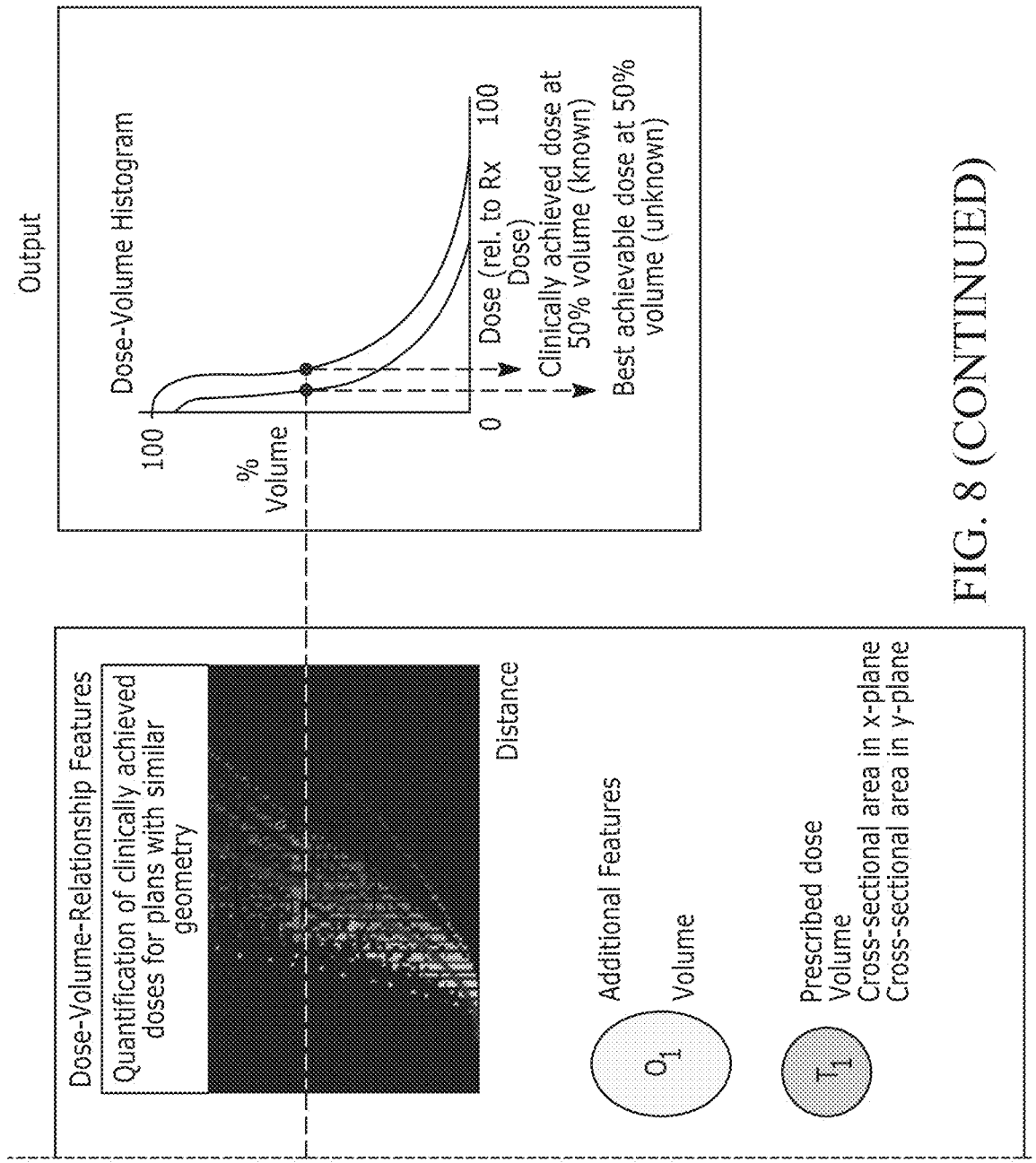

FIG. 8 illustrates an example of an extraction of all processed input features and outputs for each plan in the training data set prior to machine-learning model training. Shape-relationship features are extracted for all plans prior to training since they can be calculated without any outside information. Dose-volume relationship features are extracted directly prior to prediction, in the modeling pipeline, because they rely on achieved doses for the training data. Parameters related to calculation of these features ($v_{th}$, r, and t) are optimized as hyperparameters to maximize the validation coefficient of determination ($R^2$).

The models generate two outputs, but only one "ground-truth" output may be needed for model training. Expected doses, also referred to as "clinically-achieved" doses, are extracted for each plan in the training data set from DVHs calculated from the dose grid associated with the clinical treatment plan. Best-achievable doses are assumed to be lower than the clinically achieved dose. However, models cannot be trained directly with the "ground truth" best-achievable dose because it is not possible to know what the true lowest achievable dose is, especially considering the range of factors that influence this dose, including decisions by the clinician to prioritize sparing one OAR over another. Instead, machine-learning models are trained to predict the expected dose, then a calibrated prediction interval to the left of the expected dose is used as the estimated best-achievable dose to be used to drive treatment plan optimization. This methodology was validated through a blinded clinical study with three expert radiation oncologists specializing in prostate cancer RT.

Machine Learning Model Training and Development

Machine-learning-based model development begin with querying OVHs and corresponding DVHs for plans that meet modeling criteria. Features are then extracted as described in the preceding section in relation to FIG. 8. The machine-learning modeling pipeline includes, for example, feature extraction, feature pre-processing and selection methods, and regression ensemble model training with 5-fold leave-k-OVHs-out cross-validation and 50 iterations of a random grid search for hyperparameter optimization. Hyperparameters include aspects of the model itself and aspects of the feature calculation methods ($v_{th}$, r, and t). Missing data is handled with complete-case analysis. For each combination of PTV type and OAR, cases are only included if that OAR was contoured in the set of ROIs associated with the case, and only if a dose grid is associated with the plan, making it possible to calculate a DVH and all OVH-related features for the PTV-OAR combination in question.

Features are calculated for each % volume separately, but points from each OVH are held out in the same fold of cross-validation to avoid data leakage. Predicted best-achievable doses represented the low-dose side of a prediction interval around the predicted expected dose. The width of the prediction interval is adjusted to reflect the uncertainty in the expected dose prediction, ensuring that more uncertain expected dose predictions does lead to unachievable best achievable dose predictions. Model performance is assessed by calculating the $R^2$, mean absolute error, and maximum error between the predicted typically achieved dose and the clinically achieved dose over the cross-validation set. The predicted mean dose for each OAR is also compared with the clinically achieved mean dose for each OAR. Finally, prediction models are also created for each PTV type-OAR combination using a previously validated JHU statistical method used to make predictions over the same cross-validation folds and compared with the machine-learning-based predictions as a baseline.

Post-Processing of Predicted Dose

The dose to each % volume is predicted relative to the prescription dose to each PTV, then scaled to the prescription dose for plan optimization and evaluation. Since dose predictions are made separately for each point, post-processing of each predicted DVH curve is needed. Post-processing includes, for example, spline-based smoothing with a constraint that the dose predictions for each % volume is monotonically increasing as % volume decreases.

Application to Previously Unseen Data

Figure 9:
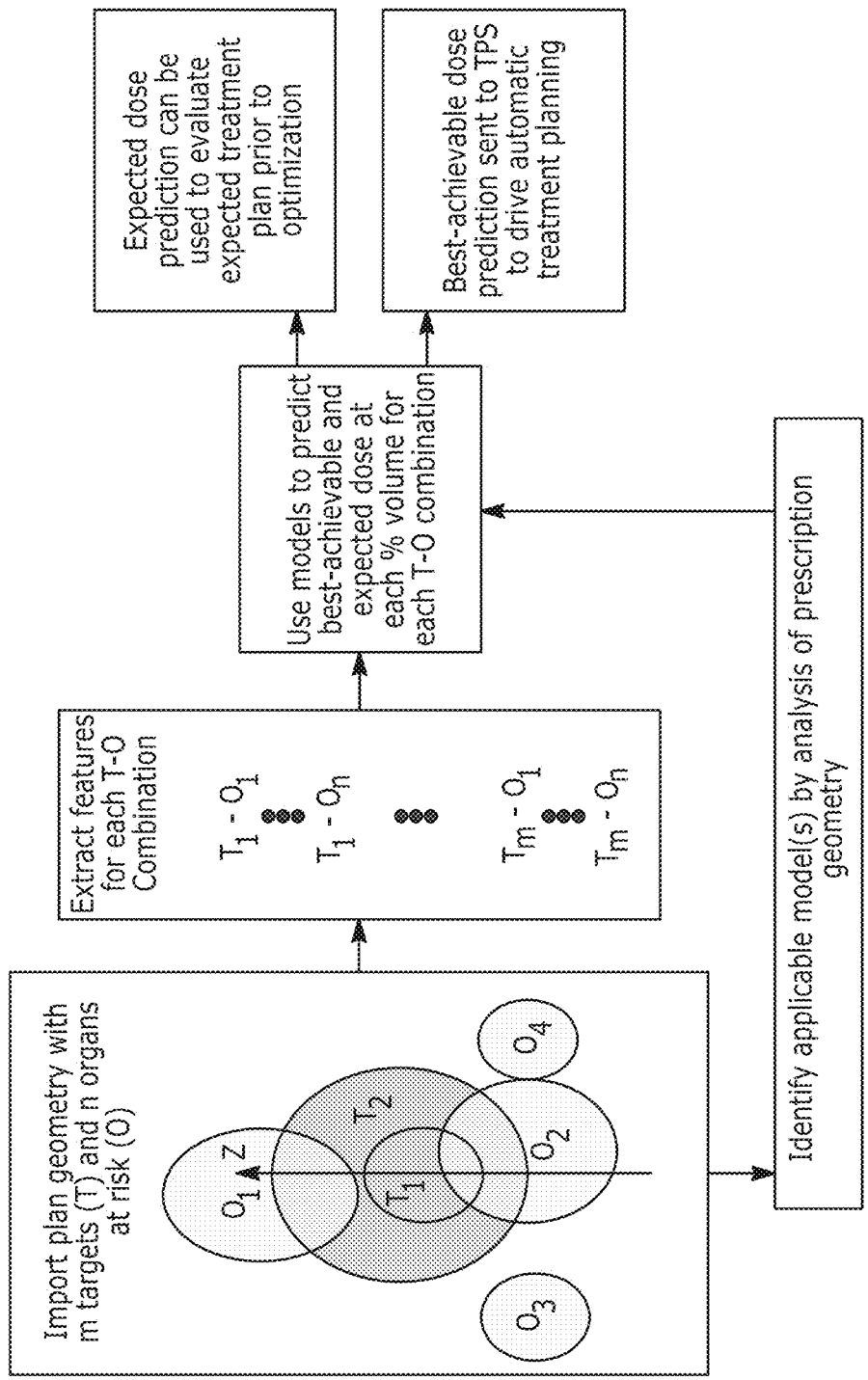
FIG. 9 is a flow diagram of one example of a machine-learning-based dose-volume histogram prediction for an incoming plan.

FIG. 9 illustrates an example of a procedure for applying machine-learning models to previously unseen data. The plan geometry (with any number (m) of targets and any number (n) of organs at risk) is contoured. Features are extracted for each target-organ at risk combination. A process selects the applicable machine-learning models for each target by analysis of the prescription and geometry, then the selected models are used to predict the best-achievable and expected doses at each % volume for each target-organ at risk combination. Expected dose predictions are used to evaluate the expected treatment plan, while best-achievable dose prediction are used to drive automated treatment planning.

Preliminary Validation and Testing Results

Machine-learning-based predictions for the expected dose can be assessed by comparison with clinically achieved doses. Predictions are not made for the test set until after the typically achieved dose models are finalized, and researchers are blinded to the contents of the validation set during model development. The best-achievable dose predictions cannot be assessed in the same way, since it is extremely difficult to know what the true best-achievable dose is for a specific patient, and because the dose to each OAR is dependent on the dose to other OARs and the clinician's judgment on OAR sparing priorities. Instead, to assess the ability of the best achievable dose predictions to effectively drive treatment plan optimization, plans are generated using the auto-planning methods described herein using best-achievable dose predictions as dosimetric objectives, and the achieved auto-plan doses are compared with the clinical plan doses. Expert radiation oncologists then perform blinded plan review to assess the quality of the auto-plans compared to the clinical plans.

Figure 10:
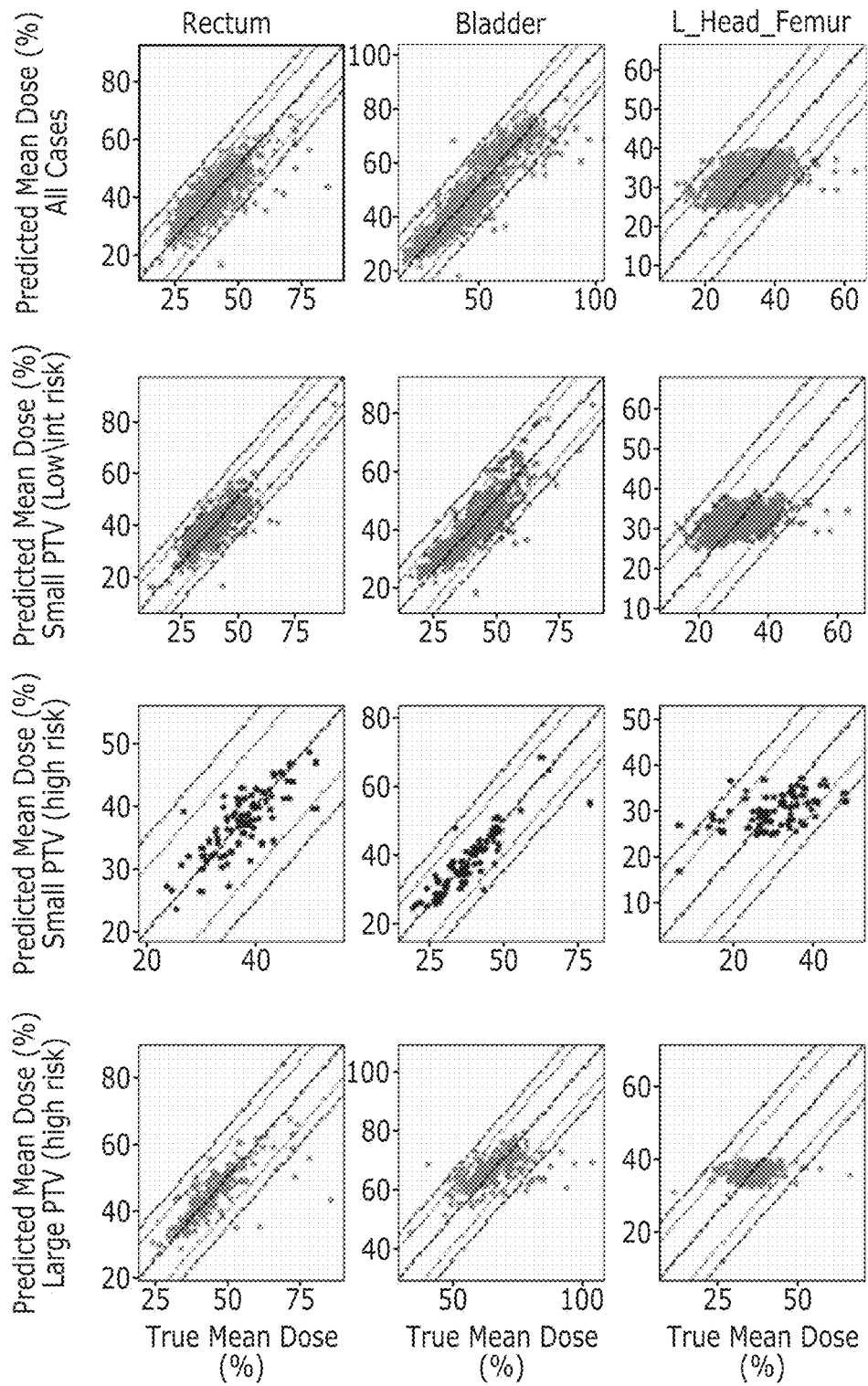
FIG. 10 includes graphs of examples of true vs predicted mean dose for 7 OARs, relative to prescribed dose to each corresponding PTV, over 5-fold cross-validation.
Figure 10:
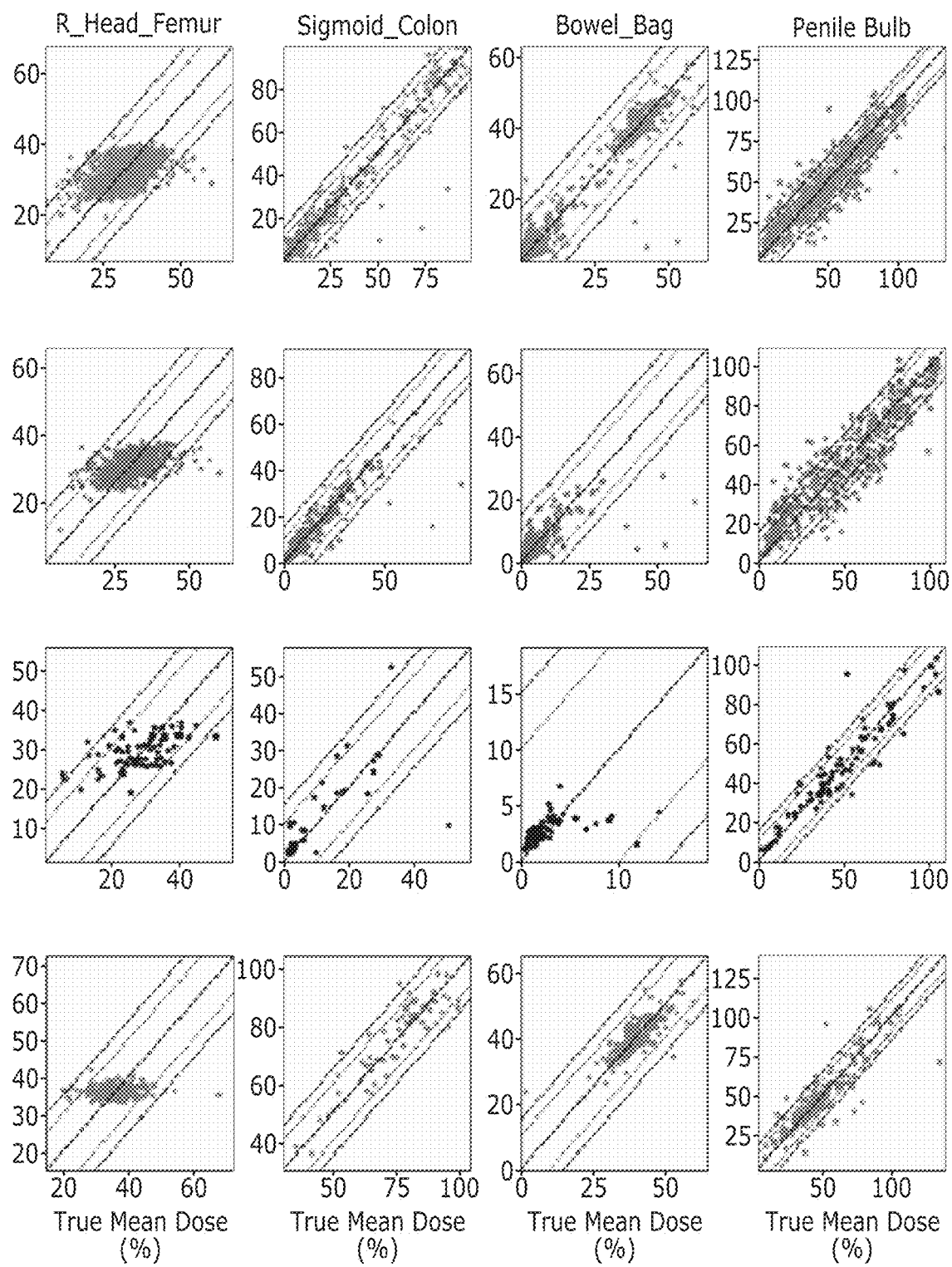
Figure 11:
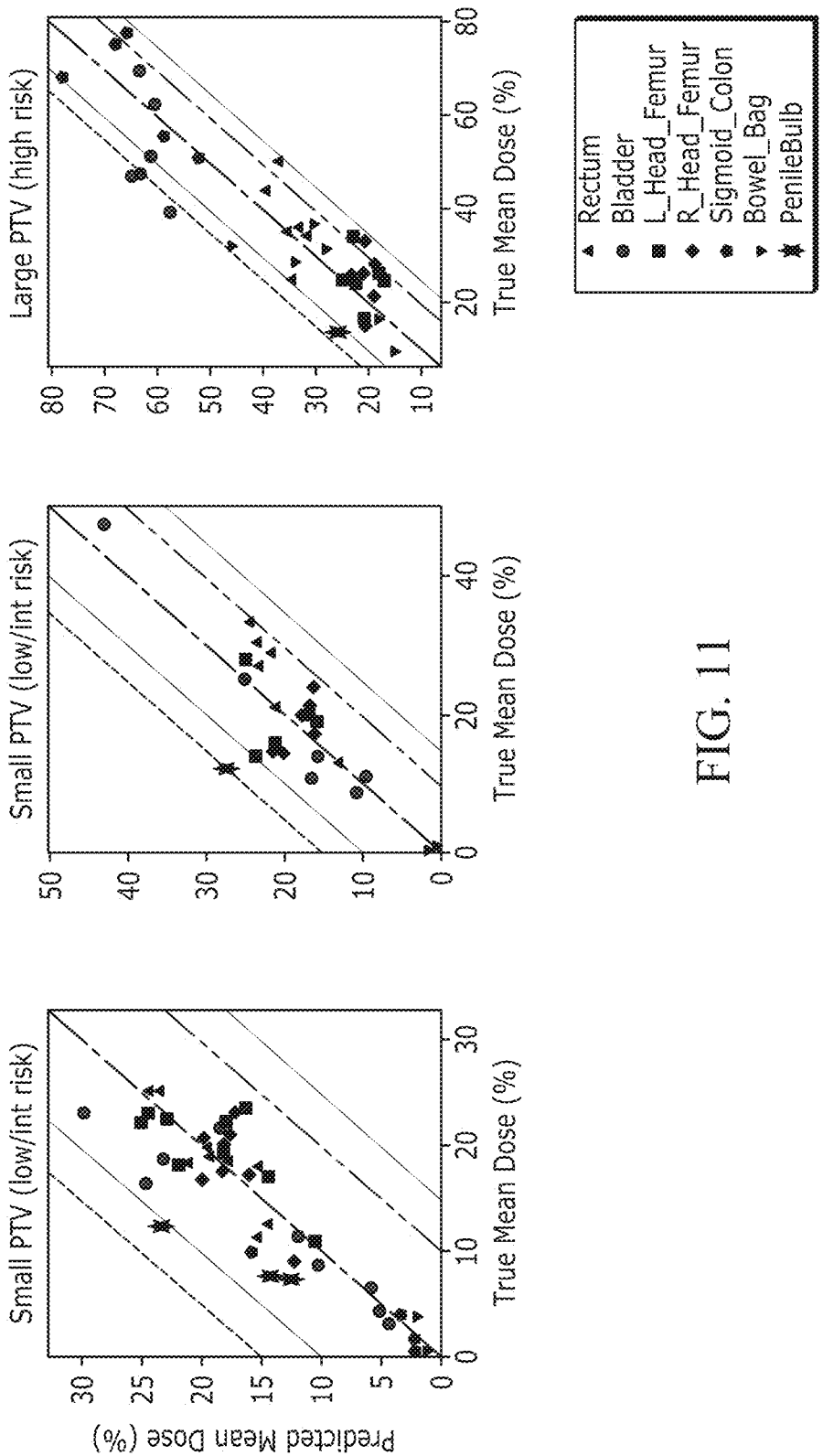
FIG. 11 includes graphs of examples of true vs predicted mean dose for 7 OARs, relative to prescribed dose to each corresponding PTV, for an external validation set.

FIGS. 10 and 11 provide further insight into the internal cross-validation and external validation results for the expected dose prediction models. FIG. 10 shows an example of a predicted mean dose and true (clinically achieved) mean dose to each OAR for the internal cross-validation set. A total of 5,544 DVH curves were used in cross-validation over all model type-OAR combinations. For the internal cross-validation set, the predicted mean dose to each OAR is within 5% (relative to the prescribed dose to the PTV) of the true mean dose in 3,925/5,544 cases (71%), within 10% of the true mean dose in 5038/5544 cases (91%), and within 15% of the true mean dose in 5332/5544 cases (96%). FIG. 11 shows an example of a predicted mean dose and true (clinically achieved) mean dose to each OAR for the external validation set. A total of 116 DVH curves were used in external validation over all model type-OAR combinations. For the external validation set, the predicted mean dose to each OAR was within 5% (relative to the prescribed dose to the PTV) of the true dose in 78/116 cases (67%), within 10% of the true dose in 104/116 cases (90%), and within 15% of the true dose in 112/116 cases (97%).

Figure 12:
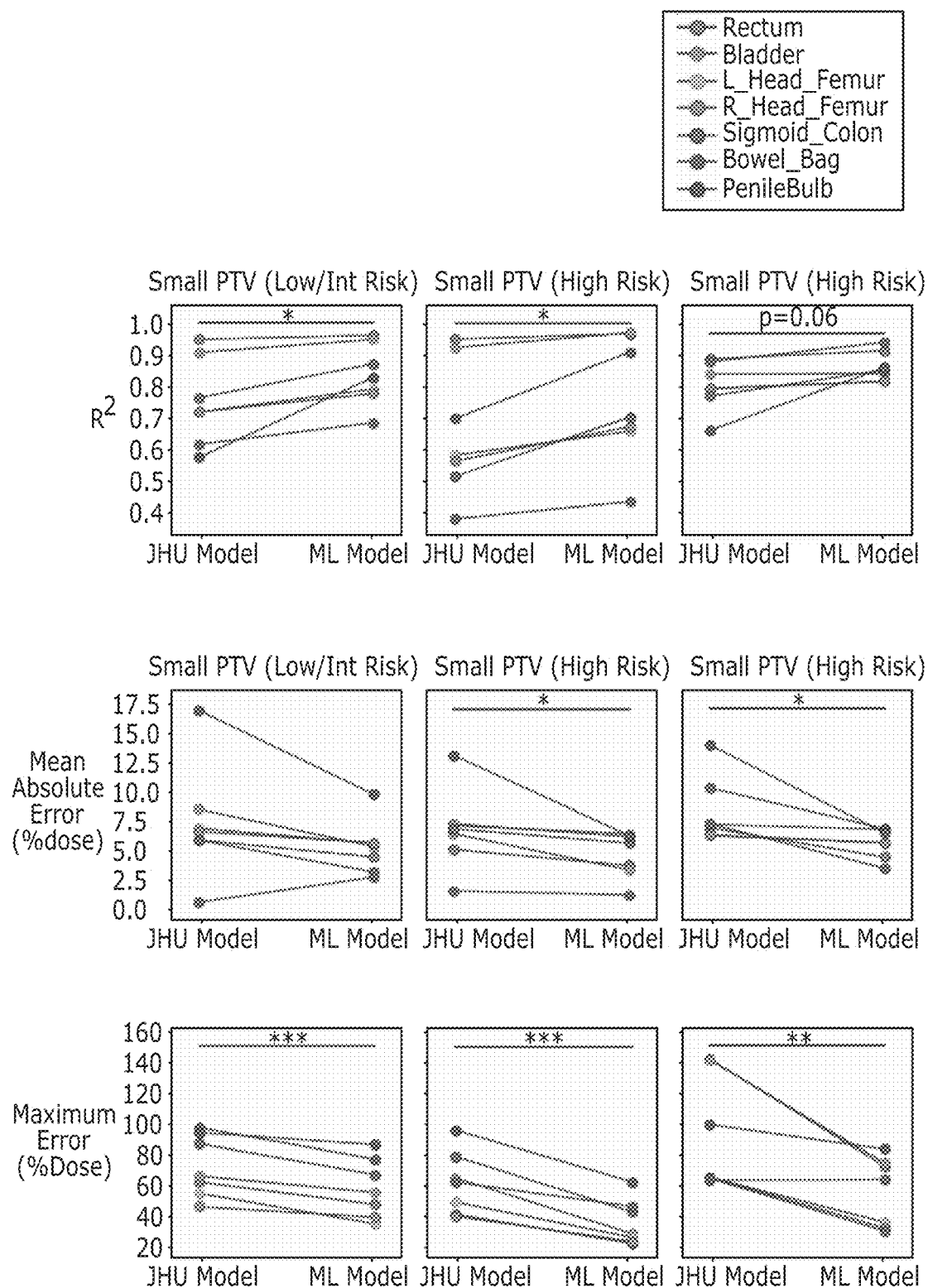
FIG. 12 includes graphs of examples of validation results for machine-learning DVH prediction and a baseline technique.

FIG. 12 provides a comparison of machine-learning-based DVH predictions with a baseline technique (the JHU statistic method) over the same cross-validation sets. The machine-learning method outperformed the baseline technique. Compared to the baseline technique, the machine-learning-based models achieved equal or higher $R^2$ for 100% (21/21) of PTV-OAR combinations, equal or lower mean absolute error for 95% (20/21) of PTV-OAR combinations, and equal or lower maximum error for 100% (21/21) of PTV-OAR combinations.

Following internal cross-validation and external validation of the expected dose predictions, a blinded clinical evaluation was carried out to demonstrate the clinical utility of the best achievable dose predictions in efficiently driving treatment plan optimization and producing clinically acceptable plans. Results are summarized for the pilot and for the 12 test cases in a table included in FIG. 13. The acceptability of each plan is shown along with the preferable plan in each pair.

The table included in FIG. 13 shows that the auto-plan was preferred by RadOnc A for all 12 cases, by RadOnc B for 10 cases, and by RadOnc C for 9 cases. For all the 12 cases, the auto-plan was preferred by overall majority (3-0 or 2-1). Consistent with these preferences, the acceptability rating of the auto-plans was at least as high as the clinical plan for all 36 pairs. Over the 36 instances of evaluating pairs of plans, the auto-plans were rated as fully acceptable 32 times (89%), marginally acceptable 2 times (6%), and not acceptable 2 times (6%), while clinical plans were rated fully acceptable 23 times (64%), marginally acceptable 6 times (17%), and not acceptable 7 times (19%).

Figure 14:
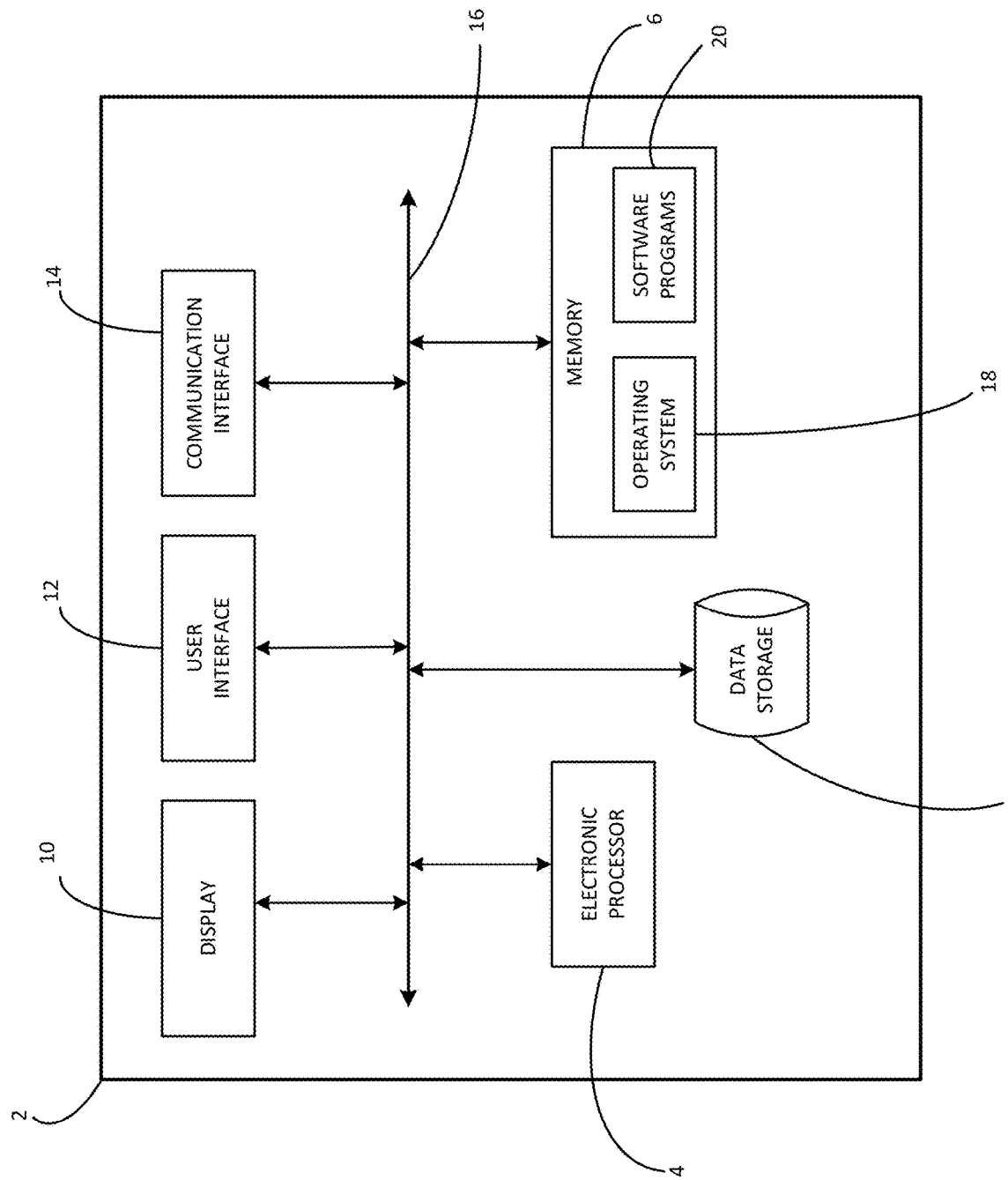
FIG. 14 is a block diagram of an example of a system for determining machine-learning DVH prediction.

FIG. 14 is a block diagram an example of a system 2 for determining volumetric segmentation of structures in planar medical images. The system 2 may combine hardware, software, and firmware, to implement the methods described herein. The system 2 illustrated in FIG. 14 includes an electronic processor 4, a memory 6, a data storage 8, a display 10, a user interface 12, a communication interface 14, and a bus 16. In some implementations, the system 2 includes fewer or additional components in configurations different from the one illustrated in FIG. 14. For example, in some implementations, the system 2 includes multiple electronic processors, displays, or combinations thereof.

The electronic processor 4 may include at least one processor or microprocessor that interprets and executes a set of instructions stored, for example, in the memory 6. The memory 6 may include volatile memory elements (for example, random access memory (RAM)), nonvolatile memory elements (for example, ROM), and combinations thereof. The memory 6 may have a distributed architecture, where various components are situated remotely from one another, but may be accessed by the electronic processor 4. The memory 6 may include an operating system 18 and software programs 20. The software programs 20 may be configured to implement the methods described herein. The memory 6 may also store temporary variables or other intermediate information used during the execution of instructions by the electronic processor 4.

The data storage 8 may include a non-transitory, tangible, machine-readable storage medium that stores machine-readable code or instructions. In one example, the data storage 8 stores a set of instructions detailing the methods described herein that when executed by the electronic processor 4 cause the electronic processor 4 to perform the methods. The data storage 8 may also include a database or a database interface for storing an application module. In some implementations, the data storage 8 is located external to the system 2.

The display 10 is a suitable display, for example, a liquid crystal display (LCD) touch screen, or an organic light-emitting diode (OLED) touch screen. In some implementations, the system 2 implements a graphical user interface (GUI) (for example, generated by the electronic processor 4, using the operating system 18 stored in the memory 6, and presented on the display 10), that enables a user to interact with the system 2.

The user interface 12 can include any combination of digital and analog input devices required to achieve a desired level of control for the system 2. In some implementations, the user interface 12 includes one or more electronic devices for receiving user input such as a keyboard, a mouse, a trackpad, and the like. Alternatively, or in addition, the user interface 12 includes a touch sensitive interface. For example, in some implementations, the display 10 is a touch-screen display that receives user input using detected physical contact (for example, detected capacitance or resistance). Based on user input, the display 10 outputs signals to the electronic processor 4 which indicate positions on the display 10 currently being selected by physical contact. In some implementations, the user interface 12 is located external to the system 2.

The communication interface 14 provides the system 2 a communication gateway with an external network (for example, a wireless network, the Internet, etc.). The communication interface 14 may include, for example, an Ethernet card or adapter or a wireless local area network (WLAN) card or adapter (for example, Institute of Electrical and Electronic Engineers standard 802.11 a/b/g/n). The communication interface 14 may include address, control, and/or data connections to enable appropriate communications on the external network.

The bus 16, or other component interconnection, may permit communication among the components of the system 2. The bus 16 may be, for example, one or more buses or other wired or wireless connections, as is known in the art. The bus 16 may have additional elements, which are omitted for simplicity, such as controllers, buffers (for example, caches), drivers, repeaters and receivers, or other similar components, to enable communications. The bus 16 may also include address, control, data connections, or a combination of the foregoing to enable appropriate communications among the aforementioned components.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the present disclosure.

It is to be understood that the phraseology and terminology used herein is for the purpose of description and should not be regarded as limiting. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software-based devices, as well as a plurality of different structural components may be utilized to implement the present disclosure. It should also be noted that a plurality of hardware and software-based devices, as well as a plurality of different structural components may be used to implement the present disclosure. In addition, it should be understood that implementations of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A method for machine-learning-based prediction of a dose-volume histogram for radiotherapy treatment planning, the method comprising:
    receiving prescription information and a plan geometry, wherein the plan geometry including a planning target volume and an organ at risk;
    extracting a plurality of input features using the plan geometry and a machine-learning model trained to predict achievable dose-volume histograms for organs at risk based on a given plan geometry and prescription information, without determining or modifying beam configurations; and
    determining the dose-volume histogram by combining the plurality of input features using the machine-learning model.

2. The method of claim 1, wherein sources of the plurality of input features include projection-masked overlap volume histograms.

3. The method of claim 2, wherein the projection-masked overlap volume histograms including about-Z-axis projection-masked overlap volume histograms and along-Z-axis projection-masked overlap volume histograms.

4. The method of claim 1, wherein the plurality of input features including volume points from projection-masked overlap volume histograms.

5. The method of claim 1, wherein the plurality of input features including shape features from standard overlap volume histograms and projection-masked overlap volume histograms.

6. The method of claim 1, wherein the plurality of input features including features extracted from dose-volume relationships.

7. The method of claim 1, wherein the plurality of input features including a surface area of a projection of the planning target volume in the xz-plane and the yz-plane.

8. The method of claim 1, further including selecting the machine-learning model from a plurality of machine-learning models based on the prescription information and the plan geometry, wherein a unique set of input features is associated with each of the plurality of machine-learning models.

9. The method of claim 8, wherein the selected machine-learning model is associated with the type of the planning target volume and the organ at risk included in the plan geometry, and wherein each of the plurality of machine-learning models is associated with a unique combination of an organ at risk and a planning target volume type.

10. The method of claim 9, further comprising training the selected machine-learning model with training data associated with the type of the planning target volume and the organ at risk included in the plan geometry.

11. A system for machine-learning-based prediction of a dose-volume histogram for radiotherapy treatment planning, the system comprising:
an electronic processor; and
a memory storing instructions that, when executed by the electronic processor, cause the electronic processor to:
receive prescription information and a plan geometry, wherein the plan geometry including a planning target volume and an organ at risk,
extract a plurality of input features using the plan geometry and a machine-learning model trained to predict achievable dose-volume histograms for organs at risk based on a given plan geometry and prescription information, without determining or modifying beam configurations, and
determine the dose-volume histogram by combining the plurality of input features using the machine-learning model.

12. The system of claim 11, wherein sources of the plurality of input features include projection-masked overlap volume histograms.

13. The system of claim 12, wherein the projection-masked overlap volume histograms including about-Z-axis projection-masked overlap volume histograms and along-Z-axis projection-masked overlap volume histograms.

14. The system of claim 11, wherein the plurality of input features including volume points from projection-masked overlap volume histograms.

15. The system of claim 11, wherein the plurality of input features including shape features from standard overlap volume histograms and projection-masked overlap volume histograms.

16. The system of claim 11, wherein the plurality of input features including features extracted from dose-volume relationships.

17. The system of claim 11, wherein the plurality of input features including a surface area of a projection of the planning target volume in the xz-plane and the yz-plane.

18. The system of claim 11, wherein the instructions further cause the electronic processor to select the machine-learning model from a plurality of machine-learning models based on the prescription information and the plan geometry, wherein a unique set of input features is associated with each of the plurality of machine-learning models.

19. The system of claim 18, wherein the selected machine-learning model is associated with the type of the planning target volume and the organ at risk included in the plan geometry, and wherein each of the plurality of machine-learning models is associated with a unique combination of an organ at risk and a planning target volume type.

20. The system of claim 19, wherein the instructions further cause the electronic processor to train the selected machine-learning model with training data associated with the type of the planning target volume and the organ at risk included in the plan geometry.

* * * * *